UNITED STATES PATENT OFFICE.

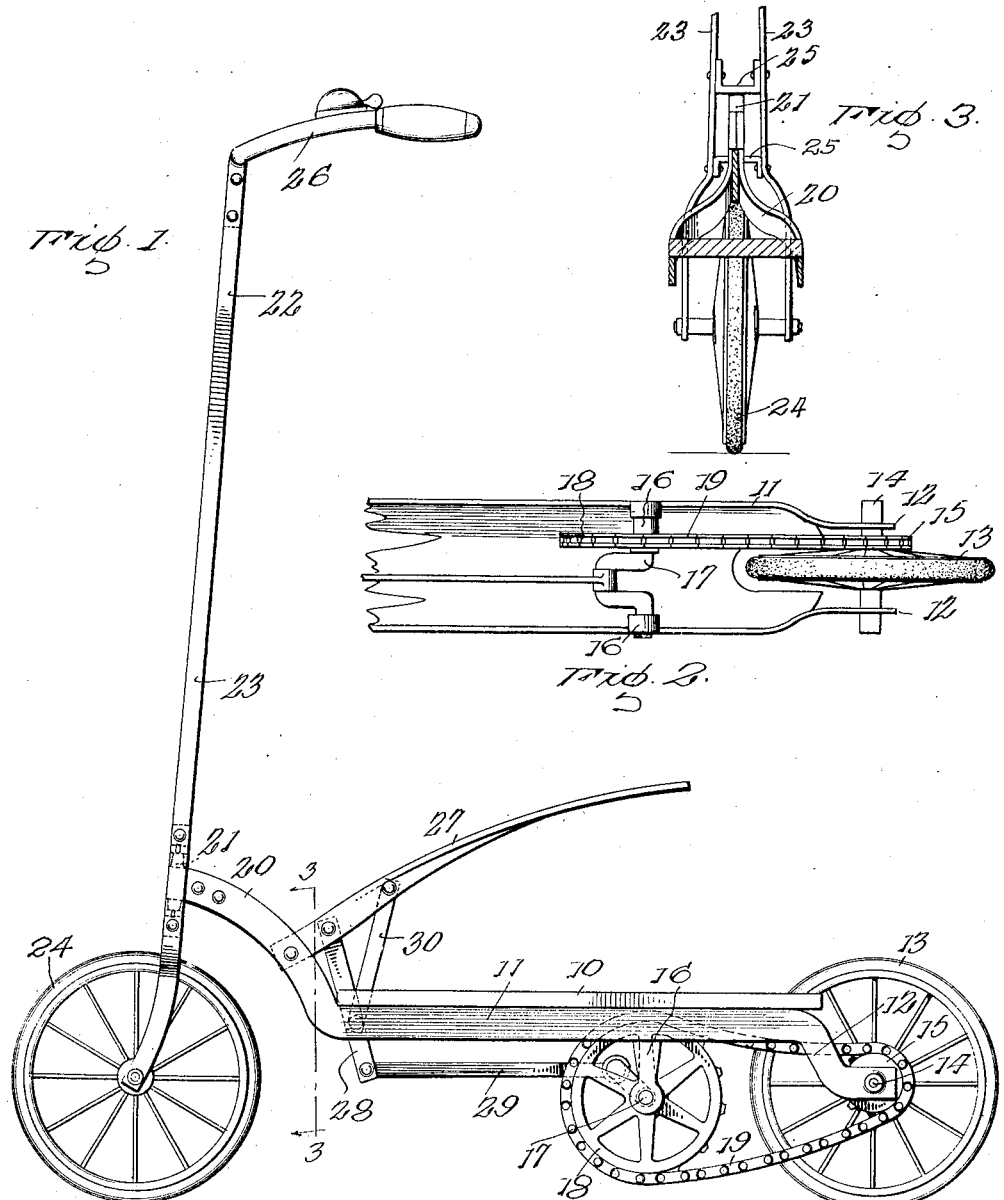

DOMENICO RUSSO, OF JERSEY CITY, NEW JERSEY.

VELOCIPEDE.

1,330,011.  Specification of Letters Patent.  Patented Feb. 3, 1920.

Application filed June 17, 1919. Serial No. 304,975.

*To all whom it may concern:*

Be it known that I, DOMENICO RUSSO, a citizen of the United States, residing at Jersey City, in the county of Hudson and State of New Jersey, have invented certain new and useful Improvements in Velocipedes, of which the following is a specification.

This invention has relation to velocipedes, and has for an object to provide a device of this kind which includes a platform mounted on two wheels, one of which is adapted for steering movement, and a foot lever operated means for driving the other wheel, thus permitting the user to stand with one foot upon the platform to use the other to operate the driving means.

In addition to the foregoing, this invention comprehends improvements in the details of construction and arrangement of parts, to be hereinafter described and particularly set forth in the appended claim.

In the accompanying drawings in which similar and corresponding parts are designated by the same characters of reference throughout the several views in which they appear.

Figure 1 is a view in side elevation of a velocipede constructed in accordance with my invention.

Fig. 2 is a fragmentary bottom plan view, and

Fig. 3 is a detail section taken on the line 3—3 of Fig. 1.

With reference to the drawings 10 indicates a platform which is supported upon a pair of longitudinally extending beams, 11, the latter having their rear ends bent downward as at 12 to receive therebetween the rear driving wheel 13 which is mounted rigidly upon an axle 14 journaled in the beams 11. A small sprocket wheel 15 is also rigidly mounted on the axle. Depending from each beam 11 is a bracket bearing 16 to support a transversely extending crank shaft 17, the latter also carrying a large sprocket wheel 18 adapted to drive the smaller sprocket wheel through the medium of a chain 19. The forward ends of the beams 11 are bent upward as at 20 and toward each other and formed into a vertical spindle 21. A fork 22 formed of spaced bars 23 is provided, the lower ends of the bars being separated to receive therebetween the steering wheel 24, the latter being loosely mounted on an axle which is secured to the fork. Spaced bars 25 are held between the bars 23 to support the ends of the spindle 21 which is journaled for rotation in said bars 25. Handle bars 26 may be mounted upon the upper end of the fork. A foot lever 27 is fulcrumed at one end between and upon the forward ends of the beams 11 and extends rearwardly above the platform and approximately throughout the length thereof. An arm 28 extends downwardly from the lever and a link 29 serves to connect said arm with the crank portion of the shaft 17. A brace bar 30 extends between the arm and lever to rigidly secure the former against movement.

In use, the operator stands with one foot upon the platform and, grasping the handle bars rests the other foot upon the foot lever, alternately transferring his weight from the lever to the platform. The motion of the lever is communicated through the link to the crank shaft 17, rotating the large sprocket wheel, which in turn drives the smaller one. In this manner the vehicle is easily propelled. When the propelling mechanism is not to be used the device may be employed in another manner, that is by pushing upon the ground with one foot.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claim.

Having thus described my invention, what I claim as new and desire to secure by United States Letters Patent is:

In a velocipede, a platform, beams supporting the same being curved upwardly at their forward ends and downwardly at their rear ends, a rear wheel mounted between the rear ends of the beam, a fork, pivot connection between the forward ends of the beam and the fork, a forward supporting wheel mounted within the fork, a chain and sprocket connection for driving the rear wheel, and a foot lever mounted upon the beam and having connections with the sprocket chain and sprocket for driving the same.

In testimony whereof I affix my signature in presence of two witnesses.

DOMENICO RUSSO. [L. S.]

Witnesses:
FREDERICK $\overset{\text{his}}{\underset{\text{mark}}{\times}}$ GIGGI,
SABATO GIGGI.